United States Patent
Ma et al.

(10) Patent No.: US 10,466,532 B2
(45) Date of Patent: Nov. 5, 2019

(54) BACKLIGHT MODULE AND DISPLAY APPARATUS

(71) Applicant: BOE TECHNOLOGY GROUP CO., LTD., Beijing (CN)

(72) Inventors: Yongda Ma, Beijing (CN); Jianbo Xian, Beijing (CN); Yong Qiao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/560,049

(22) PCT Filed: Mar. 27, 2017

(86) PCT No.: PCT/CN2017/078270
§ 371 (c)(1),
(2) Date: Sep. 20, 2017

(87) PCT Pub. No.: WO2017/202131
PCT Pub. Date: Nov. 30, 2017

(65) Prior Publication Data
US 2018/0196310 A1    Jul. 12, 2018

(30) Foreign Application Priority Data
May 27, 2016 (CN) ..................... 2016 2 0502581 U

(51) Int. Cl.
*G02F 1/1333* (2006.01)
*G02F 1/1335* (2006.01)
*F21V 8/00* (2006.01)

(52) U.S. Cl.
CPC ..... *G02F 1/133602* (2013.01); *G02B 6/0066* (2013.01); *G02F 1/133308* (2013.01);
(Continued)

(58) Field of Classification Search
CPC ......... G02F 1/133602; G02F 1/133308; G02B 6/0066
(Continued)

(56) References Cited

U.S. PATENT DOCUMENTS 8,830,419 B2    9/2014 Wang et al.
9,250,379 B2 *  2/2016 Lan ................. G02B 6/0088
(Continued)

FOREIGN PATENT DOCUMENTS

CN    101030000 A *  9/2007
CN    101030000 A    9/2007
(Continued)

OTHER PUBLICATIONS

International Search Report dated Jun. 30, 2017 in corresponding International Application No. PCT/CN2017/078270 along with an English translation of the International Search Report and an English translation of the Written Opinion of the International Searching Authority.

*Primary Examiner* — Jennifer Mehmood
*Assistant Examiner* — Ngan T Pham Lu
(74) *Attorney, Agent, or Firm* — Nath, Goldberg & Meyer; Joshua B. Goldberg

(57) ABSTRACT

The present disclosure provides a backlight module and a display apparatus, the backlight module comprises a backplate, a light guide plate, and an optical film assembly, the backplate forms a frame for accommodating the light guide plate; the light guide plate is provided within the frame; the optical film assembly is provided on a light-exiting surface of the light guide plate, and the optical film assembly extends to outside of the backplate and is fixed onto an outer wall of the backplate. The backlight module and the display apparatus provided by the present disclosure facilitates not only realization of narrow bezel but also assembly.

20 Claims, 3 Drawing Sheets

(52) U.S. Cl.
CPC .. *G02F 1/133606* (2013.01); *G02F 1/133608* (2013.01); *G02F 2001/133317* (2013.01)

(58) Field of Classification Search
USPC .......................................................... 345/102
See application file for complete search history.

(56) References Cited

U.S. PATENT DOCUMENTS

| | | | |
|---|---|---|---|
| 2017/0269289 A1* | 9/2017 | Tsai | G02B 6/0088 |
| 2018/0192525 A1* | 7/2018 | Yun | G02F 1/1333 |

FOREIGN PATENT DOCUMENTS

| | | |
|---|---|---|
| CN | 101672447 A | 3/2010 |
| CN | 102508368 A | 6/2012 |
| CN | 102865508 A | 1/2013 |
| CN | 103353078 A | 10/2013 |
| CN | 104913240 A | 9/2015 |
| CN | 204679742 U | 9/2015 |
| CN | 205384426 U | 7/2016 |
| CN | 205643976 U | 10/2016 |
| JP | 2016-4765 A | 1/2016 |

\* cited by examiner

BACKLIGHT MODULE AND DISPLAY APPARATUS

This is a National Phase Application filed under 35 U.S.C. 371 as a national stage of PCT/CN2017/078270, filed Mar. 27, 2017, an application claiming the benefit of Chinese Application No. 201620502581.3, filed May 27, 2016, the content of each of which is hereby incorporated by reference in its entirety.

TECHNICAL FIELD

The present disclosure relates to the field of liquid crystal display technology, and particularly relates to a backlight module and a display apparatus including the backlight module.

BACKGROUND

Since liquid crystals are not self-luminous, a backlight module is adopted to provide uniform and bright light for a liquid crystal panel in a liquid crystal display (LCD) apparatus.

A backlight module typically includes a light source, an optical film, a light guide plate, a backplate, etc. The light source is generally a point light source or a line light source. The light guide plate is configured to convert the point light source and/or the line light source into a surface light source, thereby providing light output with uniform brightness. The optical film is provided on a light-exiting surface of the light guide plate to further process light outputted from the light guide plate so that the light is uniformly emitted out in a direction perpendicular to the light-exiting surface of the light guide plate. The backplate is configured to support and fix components such as the light source, the light guide plate, the optical film, and the like.

SUMMARY

An object of the present disclosure is to provide a backlight module and a display apparatus, which can facilitate not only realization of narrow bezel but also assembly.

In one aspect, the present disclosure provides a backlight module comprising a backplate, a light guide plate, and an optical film assembly, wherein the backplate is configured to form a frame for accommodating the light guide plate; the light guide plate is disposed within the frame; the optical film assembly is provided on a light-exiting surface of the light guide plate, and at least one optical film layer of the optical film assembly extends to outside of the backplate and is fixed onto an outer wall of the backplate.

Optionally, the optical film assembly includes a plurality of optical film layers sequentially stacked on the light-exiting surface of the light guide plate; one of the plurality of optical film layers extends to the outside of the backplate, and is fixed onto the outer wall of the backplate.

Optionally, one uppermost optical film layer of the plurality of optical film layers extends to the outside of the backplate, and is fixed onto the outer wall of the backplate.

Optionally, the optical film assembly includes a plurality of optical film layers sequentially stacked on the light-exiting surface of the light guide plate; at least two of the plurality of optical film layers extend to the outside of the backplate, and the at least two optical film layers are stacked, in a sequence in which the at least two optical film layers are stacked, and fixed onto the outer wall of the backplate.

Optionally, at least two uppermost optical film layers of the plurality of optical film layers extend to the outside of the backplate, and are fixed onto the outer wall of the backplate.

Optionally, at least one of the at least one optical film layer of the optical film assembly that extends to the outside of the backplate is fixed onto the outer wall of the backplate by way of bonding.

Optionally, one of the at least one optical film layer of the optical film assembly that extends to the outside of the backplate is fixed onto the outer wall of the backplate by way of bonding. In this case, optionally, when the number of the at least one optical film layer that extends to the outside of the backplate is plural, adjacent two optical film layers are fixed together by way of bonding at the outside of the backplate.

Optionally, one optical film layer, which is most proximal to the outer wall of the backplate, of the at least one optical film layer of the optical film assembly that extends to the outside of the backplate is fixed onto the outer wall of the backplate by way of bonding.

Optionally, each of the at least one optical film layer of the optical film assembly that extends to the outside of the backplate is fixed onto the outer wall of the backplate by way of bonding.

Optionally, a protrusion is provided on the outer wall of the backplate, and at least one of the at least one optical film layer of the optical film assembly that extends to the outside of the backplate is anchored to the protrusion.

Optionally, one of the at least one optical film layer of the optical film assembly that extends to the outside of the backplate is anchored to the protrusion. In this case, optionally, when the number of the at least one optical film layer that extends to the outside of the backplate is plural, adjacent two optical film layers are fixed together by way of bonding at the outside of the backplate.

Optionally, one optical film layer, which is most proximal to the inner wall of the backplate, of the at least one optical film layer of the optical film assembly that extends to the outside of the backplate is anchored to the protrusion.

Optionally, each of the at least one optical film layer of the optical film assembly that extends to the outside of the backplate is anchored to the protrusion.

Optionally, the outer wall of the backplate includes an outer side wall and an outer bottom wall of the backplate.

As another technical solution, the present disclosure provides a display apparatus, including a backlight module and display panel, the backlight module being any one of the backlight modules provided above.

The present disclosure has the beneficial effects as follows.

In the backlight module provided in the present disclosure, the optical film assembly extends to the outside of the backplate and is fixed onto the outer wall of the backplate, and therefore, there is no need to provide a positioning frame for positioning the optical film assembly, thereby simplifying the structure; moreover, since no positioning structure is required to position the optical film assembly during assembly, and instead, the optical film assembly is directly fixed onto the outer wall of the backplate, assembly efficiency is high. In addition, in the present disclosure, thickness of the optical film layer(s) extending to the outside of the backplate may limit bezel size of the display apparatus, but this thickness is generally small, and therefore, the backlight module provided by the present disclosure facilitates narrow bezel of the display apparatus. The display apparatus provided in the present disclosure facilitates not only realization of narrow bezel but also assembly due to the use of the backlight module provided in the present disclosure.

DETAILED DESCRIPTION

To enable those skilled in the art to better understand technical solutions of the present disclosure, a backlight module and a display apparatus provided in the present disclosure will be described in detail below in conjunction with the accompanying drawings.

Figure 1:
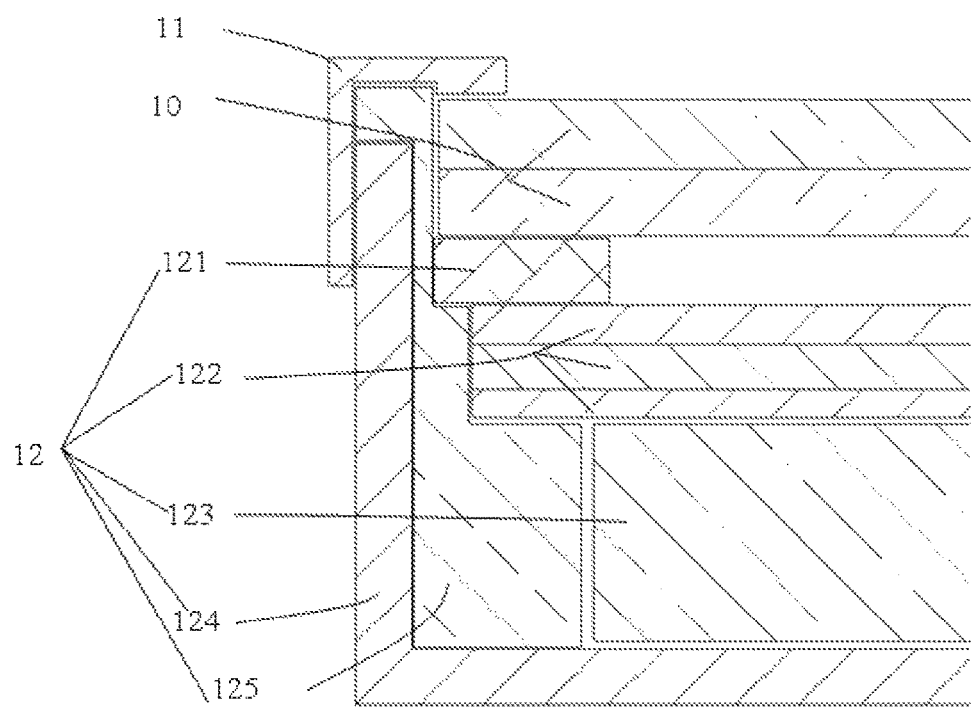
FIG. 1 is a structural schematic diagram of a LCD apparatus provided in the present disclosure.

FIG. 1 is a structural schematic diagram of a LCD apparatus provided in the present disclosure. As shown in FIG. 1, the LCD apparatus includes a LCD panel 10, a frame 11 and a backlight module 12. The frame 11 is configured to fix the LCD panel 10 and the backlight module 12. The backlight module 12 includes: a sealant frame 121, an optical film assembly 122, a light guide plate 123, a backplate 124, and a positioning frame 125. The positioning frame 125 is provided between the light guide plate 123 and the backplate 124 and to position the optical film assembly 122. Specifically, a boss is provided on the positioning frame 125 to fix the optical film assembly 122. It could be understood that the backlight module 12 further includes a light source, which may be a conventional light source in the prior art, and is not repeatedly described herein.

In practical applications, following problems may occur in the case of adopting the above backlight module 12: first, assembly efficiency is low by adopting the positioning frame 125 to position the optical film assembly 122; and secondly, to ensure reliable fixing, a size of the boss cannot be as small as possible, and thus bezel size of the display apparatus is limited, which is not conducive to realization of narrow bezel of the display apparatus.

In order to alleviate or solve the above problems, embodiments of the present disclosure provide a backlight module including a backplate, a light guide plate and an optical film assembly. The backplate is configured to form a frame for accommodating the light guide plate; the light guide plate is arranged within the frame; the optical film assembly is provided on a light-exiting surface of the light guide plate (on an upper surface of the light guide plate in the present embodiment), and at least one optical film layer of the optical film assembly extends to outside of the backplate and is fixed onto an outer wall of the backplate.

In the present disclosure, the outer wall of the backplate refers to a wall away from the light guide plate, and includes an outer bottom wall and an outer side wall of the backplate.

An inner wall of the backplate refers to a wall facing the light guide plate. For example, in a case where the backplate includes a bottom wall and a side wall, a surface of the side wall proximal to (or facing) the light guide plate is an inner side wall, and a surface of the side wall distal to (or away from) the light guide plate is an outer side wall; a surface of the bottom wall proximal to (or facing) the light guide plate is an inner bottom wall, and a surface of the bottom wall distal to (or away from) the light guide plate is an outer bottom wall. In the present embodiment, since at least one optical film layer of the optical film assembly extends to the outside of the backplate and is fixed onto the outer wall of the backplate, there is no need to additionally provide the positioning frame in the prior art to position the optical film assembly. Moreover, since no positioning structure is required to position the optical film assembly during assembly, and instead, the optical film assembly is directly fixed onto the outer wall of the backplate, assembly efficiency is high. In the present embodiment, thickness of the at least one optical film layer of the optical film assembly extending to the outside of the backplate may limit bezel size of the display apparatus, but this thickness is generally very small, and therefore, the backlight module provided by the present embodiment facilitates realization of narrow bezel of the display apparatus.

The optical film assembly 223 may include one or more optical film layers. In a case where the optical film assembly 223 includes a plurality of optical film layers, for example, includes three optical film layers, namely, optical film layers 223a~223c, the plurality of optical film layers (e.g., optical film layers 223a~223c) are sequentially stacked on the light-exiting surface of the light guide plate 222.

Figure 2:
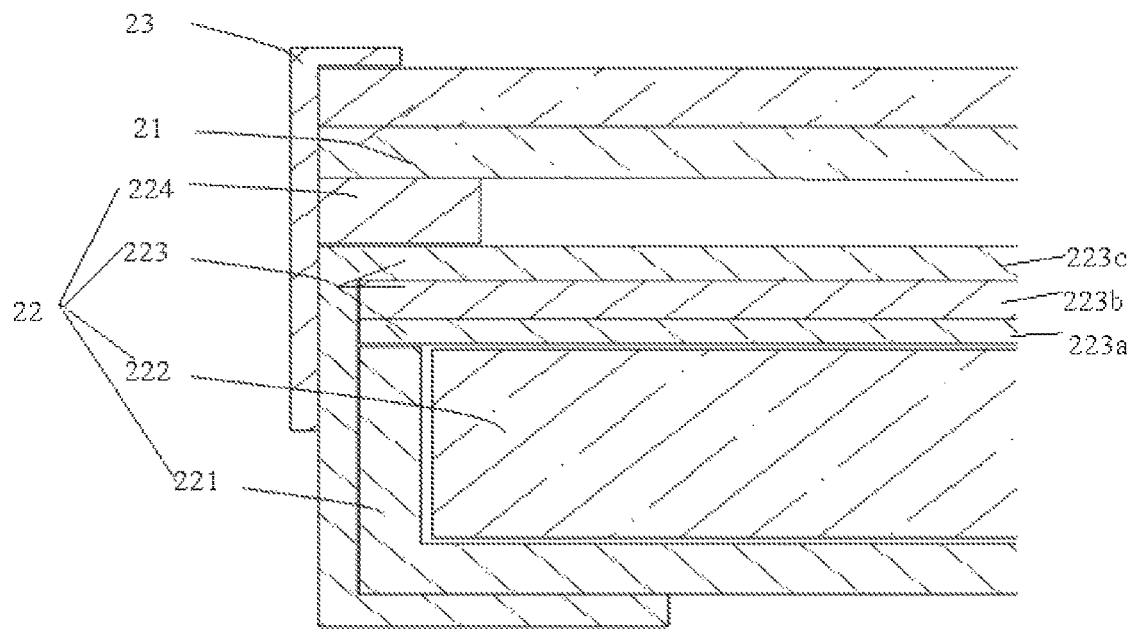
FIG. 2 is a first structural schematic diagram of a backlight module applied in a display apparatus provided by embodiments of the present disclosure.
Figure 3:
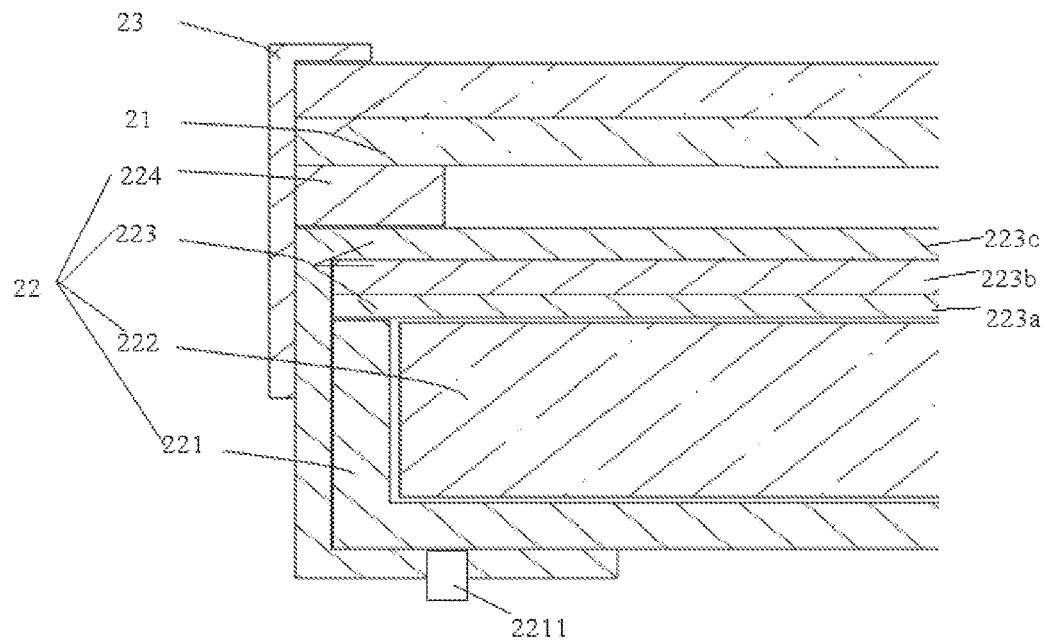
FIG. 3 is a second structural schematic diagram of a backlight module applied in a display apparatus provided by embodiments of the present disclosure.
Figure 4:
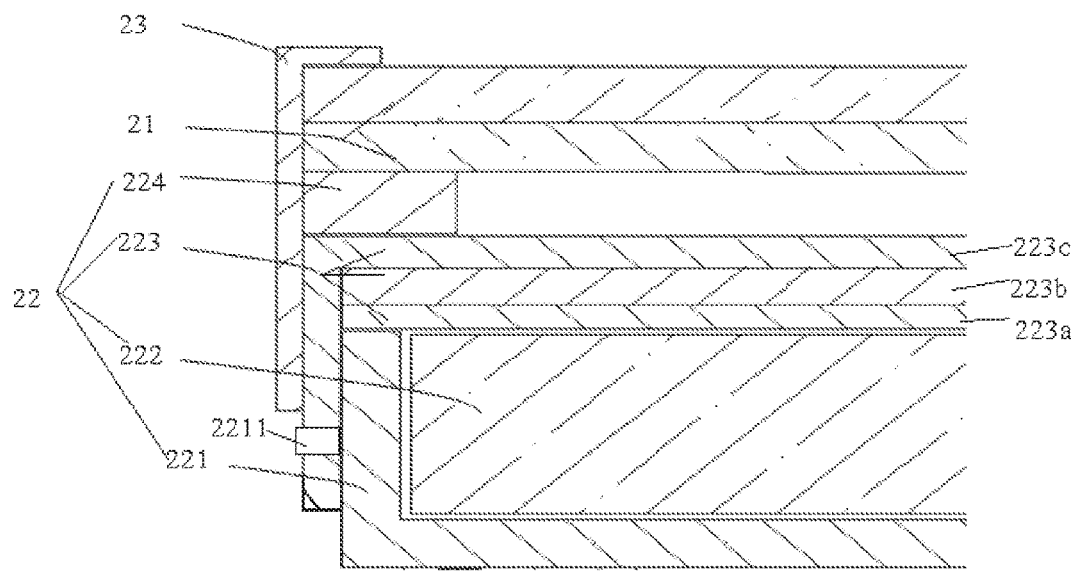
FIG. 4 is a third structural schematic diagram of a backlight module applied in a display apparatus provided by embodiments of the present disclosure.

In some embodiments, only one optical film layer of the optical film assembly 223 extends to the outside of the backplate 221 and is fixed onto the outer wall of the backplate 221. For example, the uppermost optical film layer 223c (i.e., the optical film layer 223c which is farthest away from the light guide plate 222) may be chosen to extend to the outside of the backplate 221 and be fixed onto the outer wall of the backplate 221. Specifically, as shown in FIGS. 2 and 3, the optical film layer 223c is fixed onto the outer bottom wall of the backplate 221; alternatively, as shown in FIG. 4, the optical film layer 223c is fixed onto the outer side wall of the backplate 221. In the present disclosure, the outer wall of the backplate 221 includes the outer side wall and the outer bottom wall of the backplate 221.

It could be understood that, when the optical film assembly 223 includes a plurality of optical film layers, the plurality of optical film layers may be fixed through the uppermost optical film layer (i.e., the optical film layer farthest away from the light guide plate 222) only, in this case, thickness of only the uppermost optical film layer limits the bezel size of the display apparatus, but because one optical film layer has a small thickness, influence on the bezel size of the display apparatus can be further reduced, thereby facilitating realization of narrow bezel.

Needless to say, another optical film layer, such as optical film layer 223a or 223b, may be chosen to extend to the outside of the backplate 221 and be fixed onto the outer wall of the backplate 221.

Figure 5:
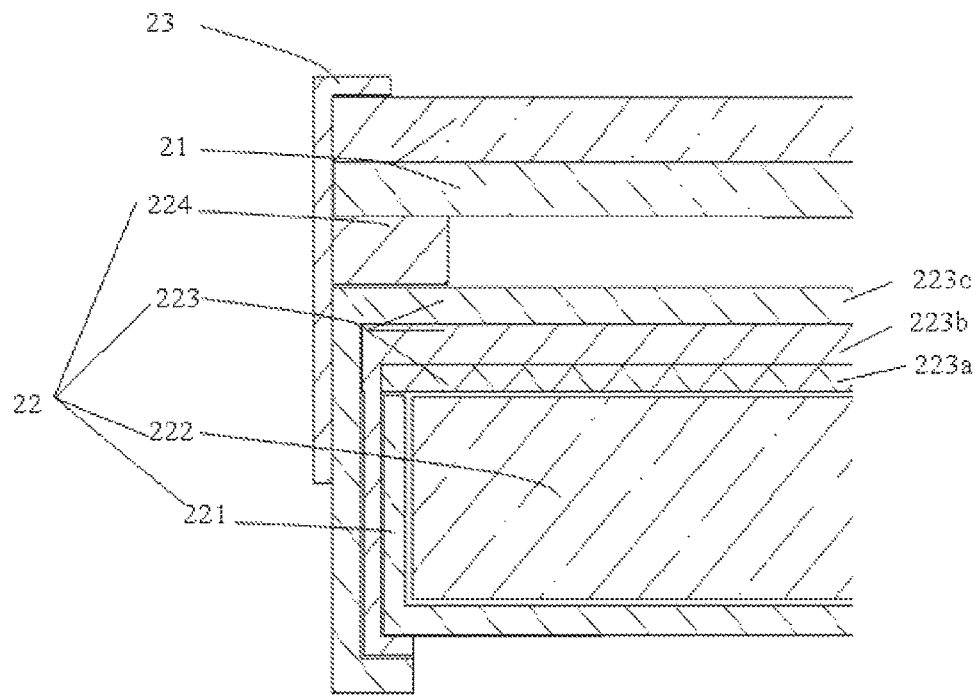
FIG. 5 is a fourth structural schematic diagram of a backlight module applied in a display apparatus provided by embodiments of the present disclosure.
Figure 6:
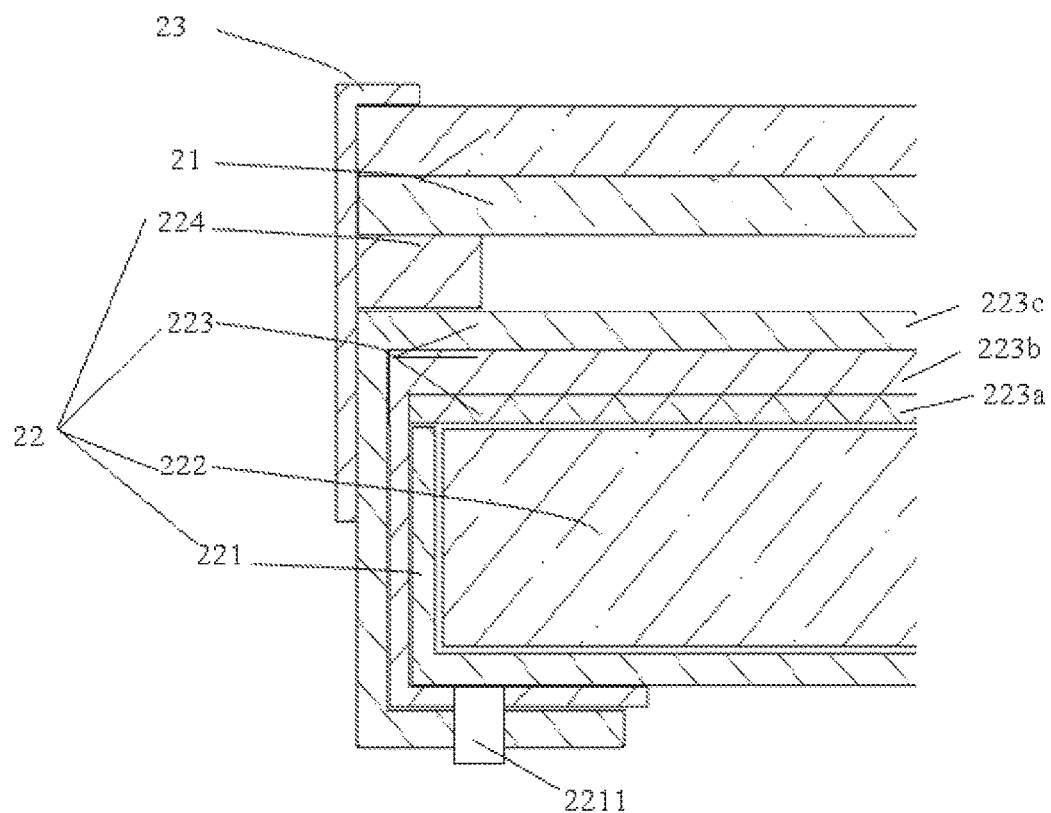
FIG. 6 is a fifth structural schematic diagram of a backlight module applied in a display apparatus provided by embodiments of the present disclosure.

In some embodiments, in order to better fix the optical film assembly 223 onto the frame, a plurality of optical film layers, such as two optical film layers 223b and 223c, may extend to the outside of the backplate 221 and be fixed onto the outer wall of the backplate 221. For example, as shown in FIGS. 5 and 6, two optical film layers 223b and 223c are stacked, in a sequence in which the two optical film layers 223b and 223c are stacked, and fixed to the outer wall of the backplate 221. The optical film layer 223b is fixed onto the outer wall of the backplate 221, and the optical film layer 223c is fixed onto the optical film layer 223b. Specifically, as shown in FIGS. 5 and 6, the optical film layers 223b and 223c may be fixed onto the outer bottom wall of the backplate 221. Alternatively, the optical film layers 223b and 223c may be fixed onto the outer side wall of the backplate 221.

It could be understood that, the present disclosure is described by taking a case where the two uppermost optical film layers extend to the outside of the backplate 221 and are fixed onto the outer wall of the backplate 221 as an example, but the present disclosure is not limited thereto. For example, other two optical film layers, for example, the optical film layers 223a and 223c, may be chosen to extend to the outside of the backplate 221 and be fixed onto the outer wall of the backplate 221. For another example, since an optical film layer has a small thickness, more optical film layers may extend to the outside of the backplate 221 and be fixed onto the outer wall of the backplate 221. For example, all of the three optical film layers 223a to 223c may extend to the outside of the backplate 221 and be fixed onto the outer wall of the backplate 221. In order to fix the at least one optical film layer of the optical film assembly 223 extending to the outside of the backplate 221 onto the outer wall of the backplate 221, one of the at least one optical film layer of the optical film assembly 223 that extends to the outside of the backplate 221 may be fixed onto the outer wall of the backplate 221 by way of bonding. For example, as shown in FIG. 2, the optical film layer 223c of the optical film assembly 223 that extends to the outside of the backplate 221 is fixed onto the outer wall of the backplate 221 by way of bonding. In a case where a plurality of optical film layers extend to the outside of the backplate 221 and are fixed onto the outer wall of the backplate 221, one (e.g., the optical film layer 223b most proximal to the backplate 221) of the plurality of optical film layers may be fixed onto the outer wall of the backplate 221 by way of bonding, and in this case, adjacent two optical film layers (e.g., the optical film layers 223c and 223b) are fixed together by way of bonding, as shown in FIG. 5. Fixing can be implemented easily by bonding, and structure of the backlight module does not need to be modified.

In the case where a plurality of optical film layers extend to the outside of the backplate 221 and are fixed onto the outer wall of the backplate 221, all of the plurality of optical film layers may be fixed onto the outer wall of the backplate 221 by way of bonding. In this case, in order that each of the plurality of optical film layers can be fixed onto the outer wall of the backplate 221 by way of bonding, an optical film layer farther away from the backplate 221 has a larger length outside the backplate 221, so as to extend to be in direct contact with the outer side of the backplate 221. For example, in the case as shown in FIG. 5, the optical film layer 223c may extend beyond the optical film layer 223b to be directly fixed onto the outer bottom wall of the backplate 221 by way of bonding. In this case, the optical film layer 223c on the outer bottom wall of the backplate 221 totally covers the optical film layer 223b on the outer bottom wall of the backplate 221 and has a length larger than that of the optical film layer 223b on the outer bottom wall of the backplate 221. Needless of say, part of the optical film layers may be directly fixed onto the outer wall of the backplate 221 by way of bonding, and the other(s) may each be fixed onto the optical film layer adjacent thereto by bonding.

Optionally, in some embodiments, a protrusion 2211 may be provided on the outer wall of the backplate 221, and at least one of the at least one optical film layer of the optical film assembly 223 that extends to the outside of the backplate 221 is anchored to the protrusion 2211. For example, as shown in FIGS. 3 and 4, the optical film layer 223c of the optical film assembly 223 that extends to the outside of the backplate is anchored to the protrusion 2211. In the case where a plurality of optical film layers extend to the outside of the backplate 221 and are fixed onto the outer wall of the backplate 221, all of the plurality of optical film layers (e.g., the optical film layers 223a to 223c) that extend to the outside of the backplate 221 may be sequentially stacked and anchored to the protrusion 2211; alternatively, at least one optical film layer (e.g., one or more optical film layers most proximal to the backplate 221) are anchored to the protrusion, and the other(s) is(are) sequentially stacked and fixed by way of bonding. For example, as shown in FIG. 6, the two optical film layers 223b and 223c extending to the outside of the backplate 221 are sequentially stacked and anchored to the protrusion 2211. Needless to say, it is also feasible that only the optical film layer 223b is anchored to the protrusion 2211, and the optical film layer 223c is fixed to the optical film layer 223b by way of bonding; alternatively, only the optical film layer 223c is anchored to the protrusion 2211, and the optical film layer 223b is fixed to the optical film layer 223c by way of bonding. The fixing by way of anchoring achieves high reliability.

In addition, the backlight module 22 may further include a shading tape (or elastic pad) 224 provided on the optical film assembly 223. The shading tape (or elastic pad) 224 is provided corresponding to an edge area of the optical film assembly 223, that is, the shading tape (or elastic pad) 224 is provided on the edge area of the optical film assembly 223 only.

In another aspect, the present disclose further provides a display apparatus, which includes a backlight module and a display panel, and the backlight module is any one of the backlight modules described in the above embodiments.

By adopting the backlight module provided by the above embodiment(s), the display apparatus provided by the present embodiment facilitates not only realization of narrow bezel but also assembly.

It could be understood that, the above implementations are merely exemplary implementations for explaining the principle of the present disclosure, but the present disclosure is not limited thereto. For those of ordinary skill in the art, various variations and improvements can be made without departing from the spirit and essence of the present disclosure, and these variations and improvements are also considered as falling into the protection scope of the present disclosure.

The invention claimed is:

1. A backlight module, comprising a backplate, a light guide plate, and an optical film assembly, the backplate being configured to form a frame for accommodating the light guide plate; the light guide plate being provided within the frame; and the optical film assembly being provided on a light-exiting surface of the light guide plate, wherein the optical film assembly comprises m optical film layers sequentially stacked on the light-exiting surface of the light guide plate, and only n optical film layers of the m optical film layers of the optical film assembly extends to outside of the backplate and is fixed onto an outer wall of the backplate, where m is an integer equal to or greater than 3, n is an integer equal to or greater than 2, and n<m.

2. The backlight module according to claim 1, wherein the n optical film layers are stacked, in a sequence in which the on optical film layers are stacked, and fixed onto the outer wall of the backplate.

3. The backlight module according to claim 2, wherein n uppermost optical film layers of the m optical film layers extend to the outside of the backplate, and are fixed onto the outer wall of the backplate.

4. The backlight module according to claim 3, wherein at least one of the n optical film layers of the optical film assembly that extends to the outside of the backplate is fixed onto the outer wall of the backplate by way of bonding.

5. The backlight module according to claim 3, wherein a protrusion is provided on the outer wall of the backplate, and at least one of the n optical film layers of the optical film assembly that extends to the outside of the backplate is anchored to the protrusion.

6. The backlight module according to claim 1, wherein at least one of the n optical film layers of the optical film assembly that extends to the outside of the backplate is fixed onto the outer wall of the backplate by way of bonding.

7. The backlight module according to claim 6, wherein only one of the n optical film layers of the optical film assembly that extends to the outside of the backplate is fixed onto the outer wall of the backplate by way of bonding.

8. The backlight module according to claim 7, wherein only one optical film layer, which is most proximal to the outer wall of the backplate, of the n optical film layers of the optical film assembly that extends to the outside of the backplate is fixed onto the outer wall of the backplate by way of bonding.

9. The backlight module according to claim 7, wherein adjacent two optical film layers are fixed together by way of bonding at the outside of the backplate.

10. The backlight module according to claim 6, wherein each of the n optical film layers of the optical film assembly that extends to the outside of the backplate is fixed onto the outer wall of the backplate by way of bonding.

11. The backlight module according to claim 6, wherein only one of the n optical film layers of the optical film assembly that extends to the outside of the backplate is fixed onto the outer wall of the backplate by way of bonding.

12. The backlight module according to claim 1, wherein a protrusion is provided on the outer wall of the backplate, and at least one of the n optical film layers of the optical film assembly that extends to the outside of the backplate is anchored to the protrusion.

13. The backlight module according to claim 12, wherein only one of the n optical film layers of the optical film assembly that extends to the outside of the backplate is anchored to the protrusion.

14. The backlight module according to claim 13, wherein only one optical film layer, which is most proximal to the inner wall of the backplate, of the n optical film layers of the optical film assembly that extends to the outside of the backplate is anchored to the protrusion.

15. The backlight module according to claim 12, wherein each of the n optical film layers of the optical film assembly that extends to the outside of the backplate is anchored to the protrusion.

16. The backlight module according to claim 1, wherein the outer wall of the backplate comprises an outer side wall and an outer bottom wall.

17. The backlight module according to claim 16, wherein the outer wall of the backplate is the outer bottom wall of the backplate.

18. A display apparatus, comprising a backlight module and display panel, wherein the backlight module is the backlight module according to claim 1.

19. A backlight module, comprising a backplate, a light guide plate, and an optical film assembly, the backplate being configured to form a frame for accommodating the light guide plate; the light guide plate being provided within the frame; and the optical film assembly being provided on a light-exiting surface of the light guide plate, wherein the optical film assembly comprises a plurality of optical film layers sequentially stacked on the light-exiting surface of the light guide plate, and only a part of the plurality of optical film layers of the optical film assembly extends to outside of the backplate and is fixed onto an outer wall of the backplate, wherein a protrusion is provided on the outer wall of the backplate, and at least one of the part of the plurality of optical film layers of the optical film assembly that extends to the outside of the backplate is anchored to the protrusion.

20. The backlight module according to claim 19, wherein only one of the part of the plurality of optical film layers of the optical film assembly that extends to the outside of the backplate is anchored to the protrusion.

* * * * *